United States Patent [19]

Puskas

[11] Patent Number: 4,514,516

[45] Date of Patent: Apr. 30, 1985

[54] METHOD FOR MANUFACTURE OF AMS-1B CRYSTALLINE BOROSILICATE MOLECULAR SIEVE WITH LOW SODIUM CONTENT

[75] Inventor: Imre Puskas, Glen Ellyn, Ill.

[73] Assignee: Standard Oil Company (Indiana), Chicago, Ill.

[21] Appl. No.: 528,847

[22] Filed: Sep. 2, 1983

Related U.S. Application Data

[63] Continuation of Ser. No. 297,174, Aug. 28, 1981, abandoned.

[51] Int. Cl.³ .............................................. C01B 35/10
[52] U.S. Cl. ..................................... 502/202; 423/277
[58] Field of Search .................. 423/277, 326–330; 502/77, 202

[56] References Cited

U.S. PATENT DOCUMENTS

| 4,151,189 | 4/1979 | Rubin et al. | 423/329 |
| 4,205,053 | 5/1980 | Rollmann et al. | 423/329 |
| 4,269,813 | 5/1981 | Klotz | 423/277 |
| 4,285,919 | 8/1981 | Klotz et al. | 423/277 |

FOREIGN PATENT DOCUMENTS

| 0011362 | 5/1980 | European Pat. Off. | 423/329 |
| 1365318 | 8/1974 | United Kingdom | 423/329 |

Primary Examiner—Edward J. Meros
Attorney, Agent, or Firm—Wallace L. Oliver; William T. McClain; William H. Magidson

[57] ABSTRACT

AMS-1B crystalline borosilicate molecular sieve is prepared by reacting under crystallization conditions an aqueous mixture containing sources for an oxide of silicon, an oxide of boron, a cation and a lower alkyl primary or secondary amine.

9 Claims, No Drawings

METHOD FOR MANUFACTURE OF AMS-1B CRYSTALLINE BOROSILICATE MOLECULAR SIEVE WITH LOW SODIUM CONTENT

This is a continuation of application Ser. No. 297,174, filed Aug. 28, 1981, now abandoned.

BACKGROUND OF THE INVENTION

This invention relates to a new method to manufacture zeolites and more particularly to a new method to manufacture crystalline borosilicate AMS-1B molecular sieve.

Zeolitic materials, both natural and synthetic, are known to have catalytic capabilities for many hydrocarbon processes. Zeolitic materials typically are ordered porous crystalline aluminosilicates having a definite structure with cavities interconnected by channels. The cavities and channels throughout the crystalline material generally are uniform in size allowing selective separation of hydrocarbons. Consequently, these materials in many instances are known in the art as "molecular sieves" and are used, in addition to selective adsorptive processes, for certain catalytic properties. The catalytic properties of these materials are affected to some extent by the size of the molecules which selectively penetrate the crystal structure, presumably to contact active catalytic sites within the ordered structure of these materials.

Generally, the term "molecular sieve" includes a wide variety of both natural and synthetic positive-ion-containing crystalline zeolite materials. They generally are characterized as crystalline alumino-silicates which comprise networks of $SiO_4$ and $AlO_4$ tetrahedra in which silicon and aluminum atoms are cross-linked by sharing of oxygen atoms. The negative framework charge resulting from substitution of an aluminum atom for a silicon atom is balanced by positive ions, for example, alkali-metal or alkaline-earth-metal cations, ammonium ions, or hydrogen ions.

Boron is not considered a replacement for aluminum or silicon in a zeolite composition. However, recently a new crystalline borosilicate molecular sieve AMS-1B was disclosed in U.S. Pat. Nos. 4,268,420 and 4,269,813 incorporated by reference herein. According to these patents AMS-1B can be synthesized by crystallizing a source of an oxide of silicon, an oxide of boron, an oxide of sodium and an organic template compound such as a tetra-n-propylammonium salt. In order to form a catalytically-active species of AMS-1B, sodium ion typically is removed by one or more exchanges with ammonium ion followed by calcination. Other methods to produce borosilicate molecular sieves include using a combination of sodium hydroxide and aqueous ammonia together with an organic template as disclosed in U.S. Pat. No. 4,285,919, incorporated herein by reference, and using high concentrations of amine such as hexamethylenediamine as described in German Patent Application No. 28 30 787. British Patent Application No. 2,024,790 discloses formation of a borosilicate using ethylenediamine with sodium hydroxide. Aluminosilicates have been prepared with low sodium content using diamines containing four or more carbon atoms as described in European Published Patent Application Nos. 669 and 11 362. U.S. Pat. Nos. 4,139,600 and 4,151,189 describe methods to produce aluminosilicate sieves containing low sodium using diamines or $C_2$–$C_5$ alkyl amines.

A method to produce AMS-1B crystalline borosilicate molecular sieve which is low in sodium would be desirable in that an exchange procedure to remove sodium would be unnecessary. Also a method to produce AMS-1B crystalline borosilicate having a higher boron content than usually prepared by conventional techniques would be very advantageous.

SUMMARY OF THE INVENTION

This invention is a method to prepare AMS-1B crystalline borosilicate molecular sieve comprising reacting under crystallization conditions an aqueous mixture containing sources for an oxide of silicon, an oxide of boron, a cation and a lower alkyl primary or secondary amine.

BRIEF DESCRIPTION OF THE INVENTION

Conventionally, AMS-1B borosilicate molecular sieve is prepared by crystallizing an aqueous mixture of sources for an oxide of boron, oxide of silicon, and an organic template compound in the presence of an alkali metal hydroxide, usually sodium hydroxide. When such a mixture is crystallized, the resulting AMS-1B molecular sieve contains alkali metal, usually sodium, ions to balance the negative framework charge caused by substitution of a boron atom for silicon in the crystalline zeolite structure. However, when used for catalytic purposes, presence of sodium ion usually is detrimental. Typically, before a catalytic composition is made, the hydrogen form of AMS-1B is prepared by exchange with ammonium ion followed by drying and calcination.

This invention is a method of directly crystallizing AMS-1B molecular sieve having a low sodium content which does not use expensive quaternary ammonium template compounds which are used in conventional preparations. Surprisingly, although an alkali metal hydroxide such as sodium hydroxide is used in the preparation of this invention, the amount of sodium in the resultant crystalline borosilicate molecular sieve is low.

In another aspect of this invention, AMS-1B crystalline borosilicate can be formed having higher boron contents than usually formed using conventional techniques.

According to this invention, AMS-1B crystalline molecular sieve is formed by crystallizing an aqueous mixture containing sources for an oxide of boron, an oxide of silicon, a metal or ammonium cation and a lower alkyl primary or secondary amine.

Typically, the mole ratios of the various reactants can be varied to produce the crystalline borosilicates of this invention. Specifically, the molar ratio of initial reactant concentration of silica to boria can range from about 2 to about 400, preferably about 4 to about 150 and most preferably about 5 to about 50. The molar ratio of water to silica can range from about 2 to about 500, preferably about 5 to about 60 and most preferably about 10 to about 35. It has been found that preparation using a water to silica molar ratio of about 10 to about 15 can be especially preferable. The molar ratio of lower alkylamine to silicon oxide used in the preparation of AMS-1B crystalline borosilicate according to this invention should be above about 0.05, typically below about 5, preferably about 0.5 to about 5.0, and most preferably about 1.0 to about 3.0. The molar ratio of lower alkylamine to source of cation compound useful in the preparation of this invention can range from 0.01 to about 100, preferably about 0.1 to about 20, and most preferably from about 1.0 to about 10.

By regulation of the quantity of boron (represented as $B_2O_3$) in the reaction mixture, it is possible to vary the $SiO_2/B_2O_3$ molar ratio in the final product.

AMS-1B crystalline borosilicate molecular sieve generally can be characterized by the X-ray pattern listed in Table I and by the composition formula (in terms of oxides):

$$0.9 \pm 0.2 M_{2/n}O:B_2O_3:ySiO_2:zH_2O$$

wherein M is at least one cation, n is the valence of the cation, Y is between 4 and about 600 and z is between 0 and about 160.

TABLE I

| d-Spacing Å (1) | Assigned Strength (2) |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

(1) Copper K alpha radiation
(2) VW = very weak; W = weak; M = medium; MS = medium strong; VS = very strong More specifically, the material of the present invention is prepared by mixing in water (preferably distilled or deionized) lower alkylamine template compound, a boron oxide source, and a cation source compound. The order of addition usually is not critical although a typical procedure is to dissolve boric acid and sodium hydroxide in water and then add the lower alkylamine template compound. Generally, the silicon oxide compound is added with intensive mixing such as that performed in a Waring Blendor. The resulting slurry is transferred to a closed crystallization vessel for a suitable time. After crystallization, the resulting crystalline product can be filtered, washed with water, dried, and calcined.

During preparation, acidic conditions should be avoided. Advantageously, the pH of the reaction system falls within the range of about 8 to about 13.5 and most preferably between about 10 and about 12.5.

Examples of sources of silicon oxides useful in this invention include silicic acid, sodium silicate, tetraalkyl silicates and Ludox, a stabilized polymer of silicic acid manufactured by E. I. du Pont de Nemours & Co. Typically, the oxide of boron source is boric acid although equivalent species can be used such as sodium borate and other boron-containing compounds.

Minor amounts of buffer compounds such as ammonium hydrogen phosphate can be added to the crystallizing mixture.

Organic templates useful in preparing AMS-1B crystalline borosilicate according to this invention include primary and secondary lower alkylamines in which the alkyl group contain 1 to 3 carbon atoms, preferably 1 to 2 carbon atoms. Examples of suitable amines are methylamine, dimethylamine, ethylamine, diethylamine, n-propylamine and di-n-propylamine. Secondary alkylamines containing different lower alkyl groups can be used. Preferable lower alkylamines are methylamine, dimethylamine, ethylamine and diethylamine.

Useful cations in this invention include alkali-metal and alkaline-earth-metal cations such as sodium, potassium, calcium and magnesium. Ammonium cations may be used in conjunction with such metal cations. Since basic conditions are required for crystallization of the molecular sieve of this invention, the source of such cation usually is a hydroxide such as sodium hydroxide.

In a more detailed description of a typical preparation of this invention, suitable quantities of lower alkylamine, boric acid ($H_3BO_3$) and sodium hydroxide are dissolved in distilled or deionized water. Preferably, the pH is adjusted between 10 and 13.5 using a compatible base or acid such as sodium bisulfate or sodium hydroxide. After sufficient quantities of silicic acid polymer (Ludox) are added with intensive mixing, preferably the pH is again checked and adjusted to a range of about 9 to about 14, preferably about 10 to about 13. The resulting slurry is transferred to a closed crystallization vessel and reacted usually at a pressure at least the vapor pressure of water for a time sufficient to permit crystallization which usually is about 0.25 to about 20 days, typically is about one to about ten days and preferably is about two to about seven days, at a temperature ranging from about 100° to about 250° C., preferably about 125° to about 200° C. The crystallizing material can be stirred or agitated as in a rocker bomb. Preferably, the crystallization temperature is maintained below the decomposition temperature of the organic amine compound. Especially preferred conditions are crystallizing at about 145° C. for about two to about four days. Samples of material can be removed during crystallization to check the degree of crystallization and determine the optimum crystallization time.

The crystalline material formed can be separated and recovered by well-known means such as filtration with washing. This material can be mildly dried for anywhere from a few hours to a few days at varying temperatures, typically about 25°–200° C., to form a dry cake which can then be crushed to a powder or to small particles and extruded, pelletized, or made into forms suitable for its intended use. Typically, materials prepared after mild drying contain the organic amine compound and water of hydration within the solid mass and a subsequent activation or calcination procedure is necessary, if it is desired to remove this material from the final product. Typically, mildly dried product is calcined at temperatures ranging from about 260° to about 850° C. and preferably about 525° to about 600° C. Extreme calcination temperatures or prolonged crystallization times may prove detrimental to the crystal structure or may totally destroy it. Generally there is no need to raise the calcination temperature beyond about 600° C. in order to remove organic material from the originally formed crystalline material. Typically, the molecular sieve material is dried in a forced draft oven at 165° C. for about 16 hours and is then calcined in air in a manner such that the temperature rise does not exceed 125° C. per hour until a temperature of about 540° C. is reached. Calcination at this temperature usually is continued for about 4 to 16 hours.

Materials which can enhance or modify catalytic activity can be incorporated with the crystalline zeolite by ion exchange, impregnation, a combination thereof, or other suitable contact means. Preferred replacing cations are those which render the crystalline borosilicate catalytically more active, especially for hydrocarbon conversion. Typical catalytically active ions include hydrogen, metal ions of Groups IB, IIA, IIB, IIIA, and VIII, and of manganese, vanadium, chromium, uranium, and rare earth elements.

Also, water soluble salts of catalytically active materials can be impregnated onto the crystalline borosilicate of this invention. Such catalytically active materials include hydrogen, metals of Groups IB, IIA, IIB, IIIA, IVB, VIB, VIIB, and VIII, and rare earth elements.

Ion exchange and impregnation techniques are well known in the art. Typically, an aqueous solution of a cationic species is exchanged one or more times at about 25° to about 100° C. Impregnation of a catalytically active compound on the borosilicate or on a composition comprising the crystalline borosilicate suspended in and distributed throughout a matrix of a support material such as a porous refractory inorganic oxide such as alumina, often results in a suitable catalytic composition. A combination of ion exchange and impregnation can be used. Presence of sodium ion in a composition usually is detrimental to catalytic activity. AMS-1B-based catalyst compositions useful in xylene isomerization can be prepared by ion exchange with nickelous nitrate or by impregnation with ammonium molybdate.

The amount of catalytically active material placed on the AMS-1B borosilicate can vary from less than one weight percent to about thirty weight percent, typically from about 0.005 to about 25 weight percent, depending on the process use intended. The optimum amount can be determined easily by routine experimentation.

The AMS-1B crystalline borosilicate useful in this invention may be used as a pure material as a catalyst or adsorbent, or may be admixed with or incorporated within various binders or matrix materials depending upon the intended process use. The crystalline borosilicate can be combined with active or inactive materials, synthetic or naturally-occurring zeolites, as well as inorganic or organic materials which would be useful for binding the borosilicate. Well-known materials include silica, silica-alumina, alumina, alumina sols, hydrated aluminas, clays such as bentonite or kaoline, or other binders well known in the art. Typically, the borosilicate is incorporated within a matrix material by blending with a sol of the matrix material and gelling the resulting mixture. Also, solid particles of the borosilicate and matrix material can be physically admixed. Typically, such borosilicate compositions can be pelletized or extruded into useful shapes. The crystalline borosilicate content can vary anywhere from a few up to 100 wt. % of the total composition. Catalytic compositions can contain about 0.1 wt. % to about 100 wt. % crystalline borosilicate material and typically contain about 2 wt. % to about 65 wt. % of such material.

Catalytic compositions comprising the crystalline borosilicate material of this invention and a suitable matrix material can be formed by adding a finely-divided crystalline borosilicate and a catalytically active metal compound to an aqueous sol or gel of the matrix material. The resulting mixture is thoroughly blended and gelled typically by adding a material such as ammonium hydroxide. The resulting gel can be dried and calcined to form a composition in which the crystalline borosilicate and catalytically active metal compound are distributed throughout the matrix material.

Specific details of catalyst preparations are described in U.S. Pat. No. 4,268,420.

The crystalline borosilicates prepared according to this invention are useful as catalysts for various hydrocarbon conversion processes and are suitable for chemical adsorption. Some of the hydrocarbon conversion processes for which the borosilicate appear to have useful catalytic properties are fluidized catalytic cracking; hydrocracking; isomerization of normal paraffins and naphthenes; reforming of naphthas and gasoline-boiling-range feedstocks; isomerization of alkylaromatics, such as xylenes; disproportionation of aromatics, such as toluene, to form mixtures of other more valuable products including benzene, xylene, and other higher methyl substituted benzenes; hydrotreating; alkylation, including (a) alkylation of benzene with ethylene, ethanol or other ethyl carbocation precursor to yield ethylbenzene, (b) alkylation of benzene or toluene with methanol or other methanol or carbocation precursor to yield xylenes, especially p-xylene, or pseudocumene, (c) alkylation of benzene with propylene and (d) alkylation of $C_3$ to $C_5$ paraffins with $C_5$ to $C_3$ olefins; hydrodealkylation; hydrodesulfurization; and hydrodenitrogenation. They are particularly suitable for the isomerization of alkylaromatics, such as xylenes, and for the conversion of ethylbenzene. Such borosilicates, in certain ion-exchanged forms, can be used to convert alcohols, such as methanol, to hydrocarbon products, such as aromatics or olefins, or for hydroformylation and syngas conversion. Borosilicates prepared according to this invention which have higher boron content than those prepared according to conventional techniques are useful particularly in xylene isomerization and conversion of methanol.

This invention is demonstrated but not limited by the following Examples and Comparative Runs.

EXAMPLES I–V

A series of reaction mixtures were prepared by dissolving a lower alkylamine, boric acid, sodium hydroxide and ammonium hydrogen phosphate as a buffer in distilled water. This solution was added to a stirred colloidal silica solution (Ludox HS-40, 40 wt. % $SiO_2$); stirring was continued for about five minutes. The resulting mixture was charged to a 0.3 liter rocking autoclave and digested at an elevated temperature. After the mixture was crystallized, the resulting product was filtered, washed with distilled water, dried overnight at 150° C., and calcined at 540° C. for four hours preceded by a programmed preheating at a temperature increase of no more than 125° C./hour. The products were analyzed by X-ray diffraction and elemental analysis. Products characterized as AMS-1B had an X-ray diffraction pattern similar to that contained in Table I and elemental analysis showing incorporation of boron. Details of these preparations and analyses are summarized in Table II.

Some preparations were exchanged with ammonium acetate before calcination. Such exchanges were performed in a one-liter kettle equipped with baffles and an air-driven stirrer. Ten to thirty grams of sieve were reacted with 25 grams of ammonium acetate in 300 milliliters of water and heated to 100° C. with stirring for 2 to 16 hours. Solids were filtered and washed with hot distilled water. After one to four such exchanges, the resulting solids were dried in a vacuum oven at 155° C. before calcination.

A catalyst composition was prepared by dispersing the above calcined sieve in PHF-alumina which is initially an acetic acid stabilized alumina hydrosol containing about 9.8 wt. % $Al_2O_3$. Ten grams of calcined sieve were added and thoroughly mixed with 408 grams of alumina hydrosol. The mixture was gelled (solidified) with addition of 60 milliliters of concentrated aqueous ammonia and 40 milliliters of distilled water. The resulting gel was dried overnight in a forced air oven at 130° C. The dried solid was calcined at 530° C. with the program as described above. The calcined solid was crushed and sized to 18 to 40 mesh (U.S. Sieve Series). Five grams of the 18-40 mesh catalyst were placed into a tubular reactor having a 0.5 inch inside diameter and preconditioned for two hours at 399° C. and 165 psig pressure with 0.3 SCF per hour flow of hydrogen. Xylene isomerization test results showing comparable isomerization activity and selectivity using catalysts prepared according to this invention to using conventionally-prepared catalysts are shown in Table III.

TABLE II

|  | Examples | | | | |
|---|---|---|---|---|---|
|  | I | II | III | IV | V |
| Reagents (grams) | | | | | |
| Water | 70 | 100 | 120 | 150 | 100 |
| Sodium Hydroxide | 4.0 | 8.0 | 5.0 | 8.0 | 8.0 |
| Boric Acid | 4.0 | 8.0 | 5.0 | 8.0 | 8.0 |
| Methylamine (40 wt. % aqueous) | 60 | 100 | 100 | — | — |
| Dimethylamine (40 wt. % aqueous) | — | — | — | — | 80 |
| Diethylamine | — | — | — | 35.3 | — |
| Ludox (HS-40, 40 wt. % $SiO_2$) | 81 | 80 | 60 | 80 | 80 |
| Ammonium hydrogen phosphate | 7.0 | 4.0 | 7.0 | 4.0 | 5.0 |
| Mole Ratios of Reagents | | | | | |
| $SiO_2/B_2O_3$ | 16.6 | 8.2 | 13.3 | 8.2 | 8.2 |
| $H_2O/SiO_2$ | 10.9 | 16.7 | 25.0 | 15.6 | 15.4 |
| Amine/$SiO_2$ | 1.4 | 2.4 | 3.2 | 0.9 | 1.3 |
| Amine/NaOH | 7.7 | 6.2 | 10.4 | 2.5 | 3.6 |
| Crystallization Conditions | | | | | |
| Time (days) | 2.5 | 3 | 3 | 2 | 2 |
| Temperature (°C.) | 166 | 167 | 152–177 | 167 | 167 |
| Final pH | — | 12.2 | 12.6 | 12.0 | 11.9 |
| Elemental Analysis (wt. %) as Synthesized | | | | | |
| B | 0.8 | 0.9 | — | 1.0 | 0.8 |
| Na | 0.002 | 0.016 | 0.002 | 0.017 | 0.002 |
| N | — | — | 1.10 | — | — |
| Elemental Analysis After Exchange (if any) and Calcination (wt. %) | | | | | |
| Number of Exchanges | 0 | 0 | 0 | 1 | 0 |
| B | 0.8 | 0.9 | 0.9 | 0.7 | 0.8 |
| Na | 0.002 | 0.016 | 0.002 | 0.025 | 0.002 |
| N | (1) 0.69 | 0.002 | 0.0155 | 0.0005 | 0.0037 |

(1) Calcined at 480° C.

TABLE III

|  | Test Runs from Examples | | |
|---|---|---|---|
|  | I | V | A[2] |
| Conditions | | | |
| Reactor Temp. (°C.) | 399 | 399 | 399 |
| Reactor Pressure (psig) | 165 | 165 | 165 |
| Space Velocity (WHSV, $hr^{-1}$) | 6.5 | 6.6 | 6.5 |
| Hydrogen/hydrocarbon (molar ratio) | 4.7 | 4.5 | 4.4 |
| Components (wt. %) | Feed | | | |
| Paraffins and Naphthenes | 0.01 | 0.28 | 0.33 | 0.32 |
| Benzene | 0.07 | 2.98 | 3.44 | 3.39 |
| Toluene | 0.07 | 0.57 | 0.74 | 0.71 |
| Ethylbenzene | 14.59 | 9.75 | 8.99 | 9.33 |
| p-Xylene | 8.86 | 20.05 | 19.80 | 19.72 |
| m-Xylene | 52.50 | 43.55 | 43.10 | 42.86 |
| o-Xylene | 23.84 | 18.60 | 18.70 | 18.63 |
| $C_9+$ | 0.08 | 4.21 | 4.92 | 5.06 |
| Results[1] | | | | |
| PATE-p-Xylene |  | 107 | 106 | 106 |
| Ethylbenzene conversion (%) |  | 33 | 38 | 36 |
| Ethylbenzene Conversion/ Xylene Loss (%) |  | 10.0 | 9.6 | 8.1 |

[1] PATE = Percent Approach to Theoretical Equilibrium
[2] A crystalline borosilicate molecular sieve prepared in accordance with U.S. Pat. No. 4,269,813 containing 0.5 wt. % boron.

What is claimed is:

1. A method to prepare AMS-1B crystalline borosilicate molecular sieve containing a low sodium content comprising reacting under crystallization conditions an aqueous mixture consisting essentially of sources for a silicon oxide, a boron oxide, sodium cation and an amine selected from the group consisting of methylamine and dimethylamine, wherein the ratio of moles of amine to sodium cation is about 1 to about 10.

2. The method of claim 1 wherein the source of boron oxide is boric acid.

3. The method of claim 1 wherein the source of sodium cation is sodium hydroxide.

4. The method of claim 1 wherein the amine is methylamine.

5. The method of claim 1 wherein the molar ratio of sources for silicon oxide to boron oxide is about 5 to about 50, the molar ratio of water to silicon oxide is about 10 to about 35, and the molar ratio of methyl amine to silicon oxide is about 1 to about 3.

6. The method of claim 1 wherein the pH of the crystallizing mixture is maintained between about 10.5 and 13.

7. The method of claim 1 wherein the crystallizing mixture is maintained at about 125° C. to about 200° C. for about one to about ten days.

8. The method of claim 1 wherein the molecular sieve is incorporated within a suitable matrix material.

9. The method of claim 8 wherein the matrix material is silica, silica-alumina or alumina.

* * * * *